UNITED STATES PATENT OFFICE.

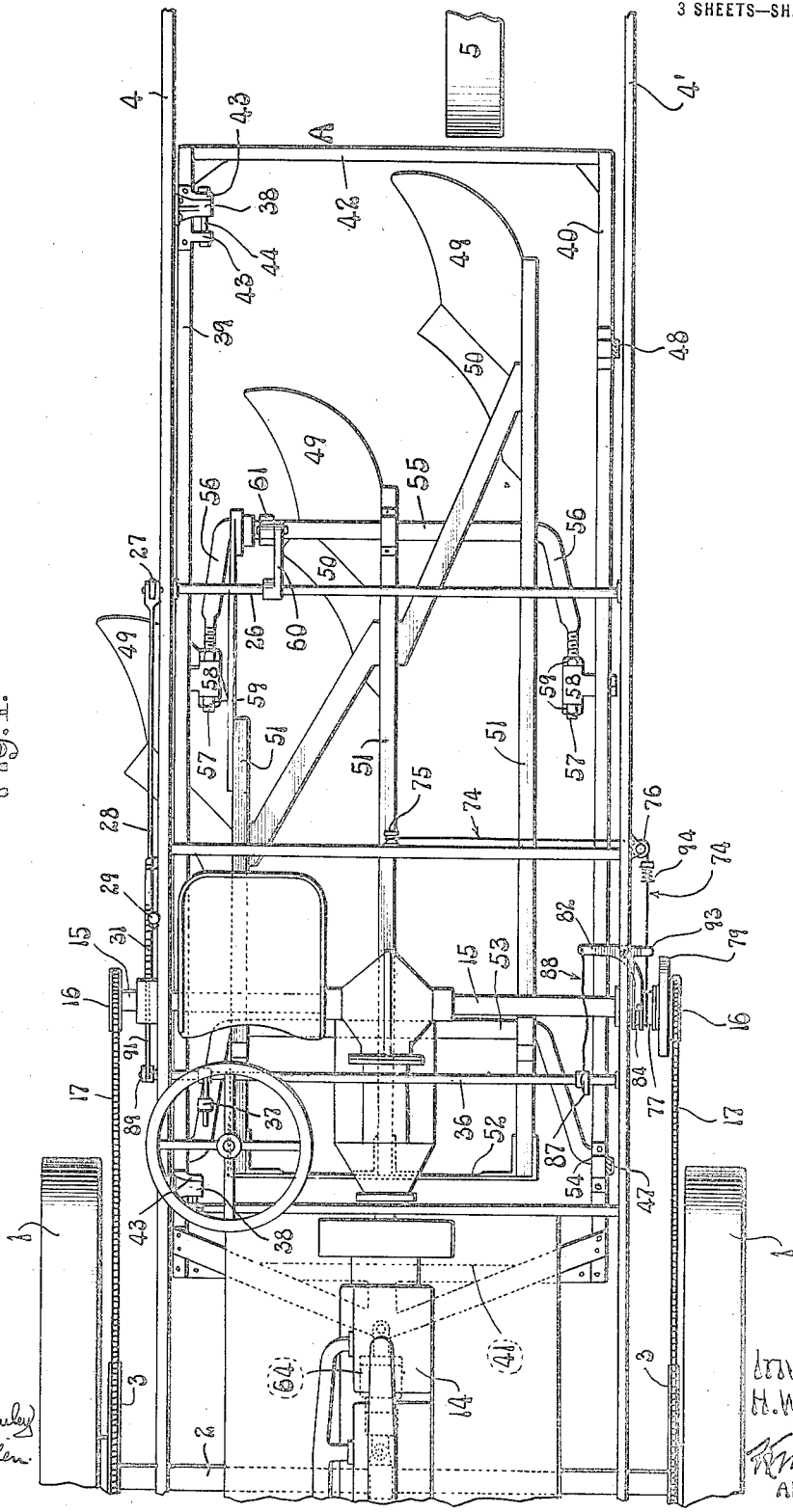

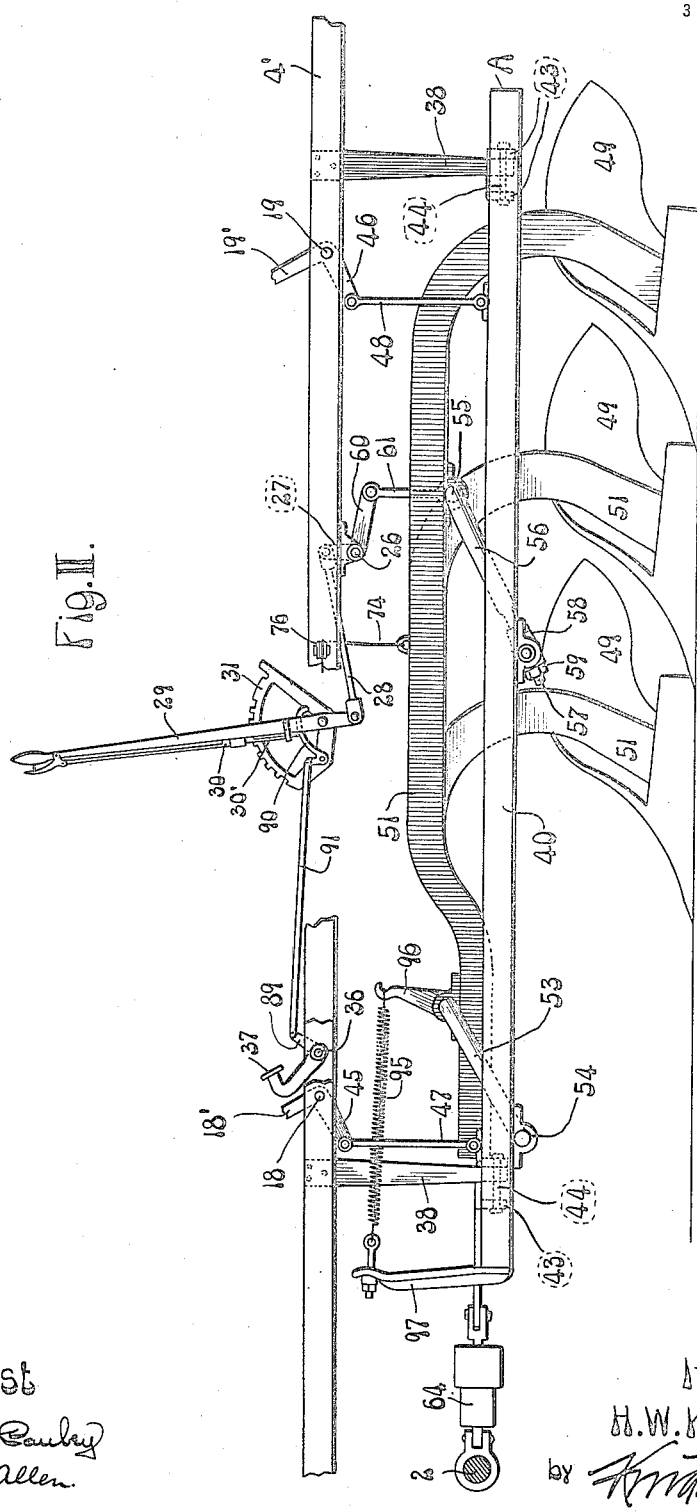

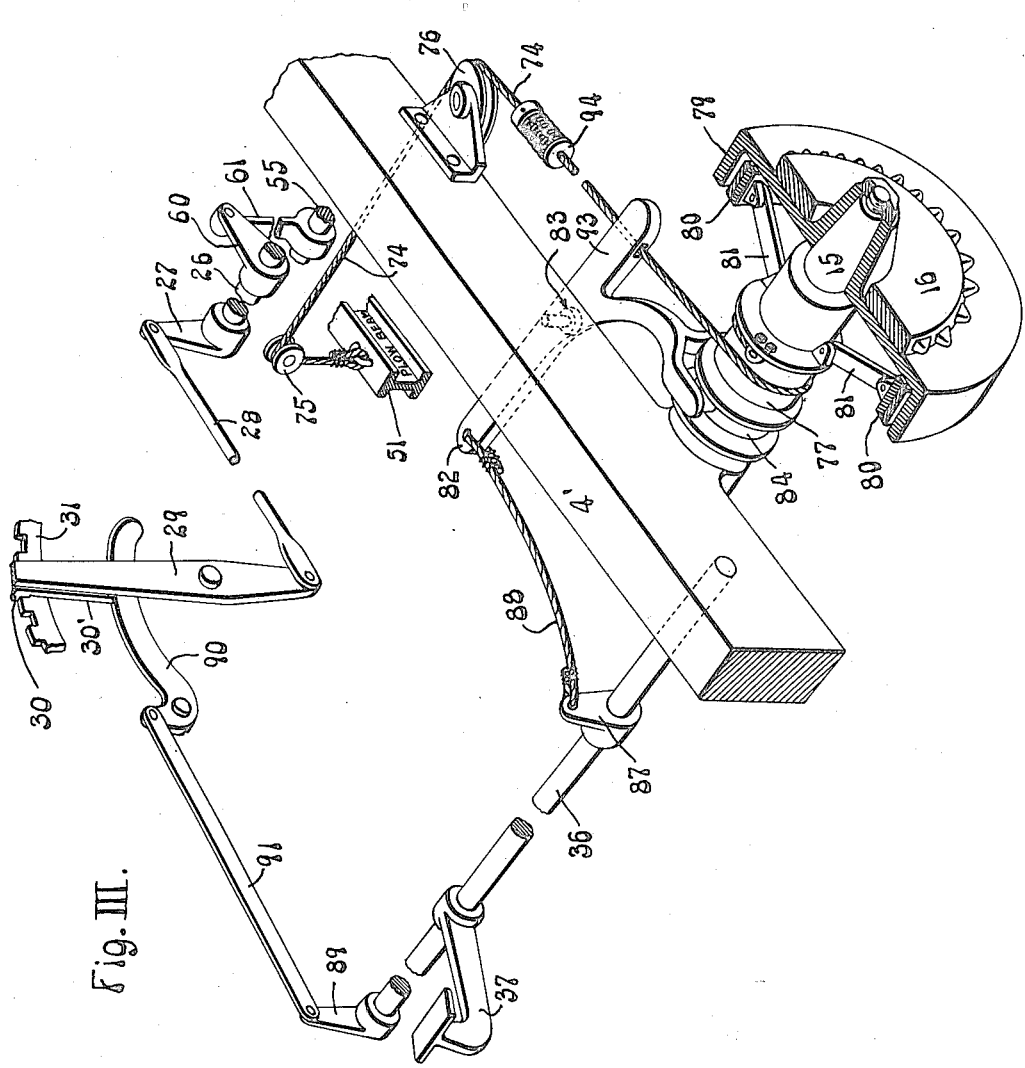

HENRY W. KARDELL, OF ST. LOUIS, MISSOURI.

TRACTION-PLOW.

1,222,299.  Specification of Letters Patent.  Patented Apr. 10, 1917.

Original application filed May 23, 1913, Serial No. 769,356. Divided and this application filed June 25, 1914.
Serial No. 847,346.

*To all whom it may concern:*

Be it known that I, HENRY W. KARDELL, a citizen of the United States of America, and a resident of the city of St. Louis and State of Missouri, have invented certain new and useful Improvements in Traction-Plows, of which the following is a full, clear, and exact description, reference being had to the accompanying drawings, forming a part of this specification.

My invention relates to a traction plow and has for its object the production of a plow lifting device operable by the engine or motor of the tractor. The invention also includes certain features found in a manually operable plow lifting device, the latter being, to a certain extent, under the control of the first named lifting device.

This application is a division of the application for patent filed by me May 23, 1913, Serial No. 769,356, tractors.

Figure I is a top or plan view of a traction plow, embodying the features of my invention, the front and rear ends of the tractor being broken away.

Fig. II is a side elevation showing the plows and plow carrying devices attached to a portion of the tractor frame, and the lifting devices for lifting the plows.

Fig. III is a diagrammatical view.

The tractor of my traction plow includes a pair of front ground wheels 1 secured to an axle 2, the ground wheels being supplied with suitable means such as sprocket wheels 3, to which power is transmitted to impart rotation to the said ground wheels from the engine of the tractor, as will hereinafter more fully appear. The tractor frame comprises longitudinal side beams 4 and 4' extending from front to rear of the frame, and also comprises suitable cross members uniting said beams. The tractor frame is supported at its rear end, when the tractor is utilized as a draft medium for my plow, by a steering wheel 5, which may be operated in any suitable manner.

14 designates an engine or motor of any suitable description carried by the tractor frame to supply the necessary power for operating the tractor and the plow elements carried by said tractor. Inasmuch as no invention is herein claimed for any particular engine or motor, it is deemed unnecessary to give any further description relative thereto.

15 designates a jack shaft operable by the engine 14. This jack shaft extends transversely of the tractor and is journaled to the side beams 4 and 4' of the tractor frame. The jack shaft serves as a medium for driving the ground wheels 1 and, as convenient means of transmitting power from said jack shaft to said ground wheels, I mount upon said jack shaft, adjacent its ends, sprocket wheels 16 that receive endless drive chains 17 operable on the sprocket wheels 3.

Before proceeding to a description of the plow elements carried by the tractor, I will enumerate the parts carried by the tractor frame and through the medium of which the plow frame and plow proper, or plows proper when the latter are used in gang, are supported and adjusted according to requirements.

18 and 19 designate, respectively, forward and rear transverse rock shafts journaled to the side beams of the tractor frame. These rock shafts are provided, respectively, with crank arms 18' and 19', operable to raise and lower one side of the plow frame.

26 is a transverse rock shaft journaled to the tractor frame and located intermediate of the rock shafts 18 and 19. This rock shaft is provided with a crank arm 27 joined by a link 28 to a pivotally supported manually operable lever 29, provided with a latch bolt 30 that engages a toothed quadrant 31.

36 is a transverse rock shaft journaled to the tractor frame and provided with a pedal 37. The utility of this rock shaft will be hereinafter set forth.

38 are hangers depending from the longitudinal side beams 4 of the tractor frame and by which the plow frame about to be described is supported at one of its sides.

The plow frame, designated A in the drawings, is a rectangular structure comprising side bars 39 and 40, a front end bar 41, and rear end bars 42. This frame is suspended beneath the tractor frame and its side bar 39 is hinged to the hangers 38 by shackles, each comprising a pair of arms 43 spaced from each other, and pivot rods 44 mounted in said arms which extend loosely through the lower ends of the hangers 38.

The plow frame is connected to the front axle 2 by a shock absorber 64.

The left hand side of the plow frame A is supported for vertical adjustment by lever arms 45 and 46 fixed, respectively, to the transverse rock shafts 18 and 19 and hanger links 47 and 48 having pivotal connection at their ends with said lever arms and with the side bar 40 of the plow frame A. This construction permits of the plow frame A being raised or lowered at the side at which the frame side bar 40 is located, the hangers 38 serving as supporting members for the frame during the raising and lowering movements, accomplished through the medium of the rock shafts 18 and 19 and parts, (not shown), coöperable therewith.

I have herein shown my plow as including a plurality of plows proper arranged in gang and will in the description hereinafter given describe a gang plow structure with the understanding that I do not limit myself to the use of any particular plows proper. The plows proper herein shown are arranged in a parallel series, and comprise the usual mold boards 49, shares 50, and beams 51, the latter being united at their forward ends by a cross connection 52. The plow beams 51 are pivotally connected at their forward ends to the side bars 39 and 40 of the plow frame A by a U-shaped stirrup 53, the arms of which are journaled to the side bars of the plow frame at 54. The plow beams are also pivotally connected to the side bars of the plow frame by a rear stirrup 55 of U-shape, the arms 56 of which are provided with screw threaded ends 57 extending through pivot blocks 58 pivoted to the side bars of the plow frame and bearing front and rear adjusting nuts 59. By making the rear stirrup as described, and providing the adjustable connection between the arms of the stirrup and the pivot blocks fitted to the side bars of the plow frame, I am enabled to lengthen or shorten the stirrup arms, between the pivot blocks 58 and the points of connection of the stirrup to the plow beams, so that the rear portions of said beams may, if desired, be caused to swing in a less or greater arc than the front ends of the beams, thereby raising or lowering the heels of the plow, permitting more or less penetration, as conditions of the soil may require.

Referring now to Fig. II, it will be noted that the plows proper and plow beams 51 are supported by the U-shaped stirrups 53 and 55, and that the rear stirrup 55 is adjustably supported by the hanger link 61. The combined weight of the plows and plow beams tends to move the stirrup 53 downwardly. This weight is counterbalanced by a spring 95 connecting an arm 96 on the stirrup 53 to an arm 97 on the plow frame A.

The plows proper and the plow frame of my traction plow are adapted to be elevated and lowered by manual operation of the lever 29 hereinbefore mentioned, and they are also adapted to be elevated by power derived from the engine of the tractor, but I will at present describe only the mechanism for the manual operation. This mechanism includes the rock shaft 26 and the lever 29, a link 28 connected to said rock shaft, a lever arm 60 fixed to said rock shaft, and a lift rod 61 pivoted to said lever arm at its upper end and loosely fitted at its lower end to the rear stirrup 55. It will be appreciated that, when the upper end of the lever 29 is thrown rearwardly and the lower end is thrown forwardly, the stirrups 53 and 55 and the plows proper will be elevated. To lower the plows proper, it is only necessary to move the lever 29 to the desired degree in the opposite direction and the parts will move downwardly.

The latch bolt 30 carried by the lifting lever 29 is normally interlocked with the quadrant 31 so as to hold the plows at the desired elevation. When the lifting power is derived from the jack shaft 15, it is necessary to disengage the latch bolt from the quadrant, thereby unlocking the plow holding means and permitting the plows to be lifted through the medium of a lifting cable 74 attached to a plow beam 51.

I will now describe the means for unlocking the lifting lever 29 from the quadrant 31 and thereafter lifting the plows by power from the jack shaft. The lifting cable 74 leads from a plow beam 51 upwardly over a pulley 75, horizontally around a pulley 76 on the tractor beam 4' and from thence to a winding drum 77, the end of the cable being secured to the winding drum. The winding drum is slidably fitted to a bearing sleeve 78 through which the jack shaft 15 passes.

79 designates a drive clutch member secured to the end of the jack shaft, and 80 is an expansible clutch member arranged within the drive clutch member 79. The expansible clutch member 80 is connected to the winding drum 77 by links 81.

82 designates a clutch throwing lever, pivoted at 83 to the tractor beam 4', and fitted to an annular groove 84 in the winding drum 77. The clutch throwing lever 82 may be operated to slide the winding drum along the bearing sleeve 78, thereby expanding the inner clutch member 80, and frictionally engaging said member 80 with the drive clutch member 79. This operation will cause the winding drum 77 to rotate with the jack shaft 15, with the result of winding the cable 74 onto the drum 77 to lift the plows from the ground.

The means for operating the clutch throwing lever 82 comprises the rock shaft 36 extending across the tractor and provided with a foot pedal 37. An arm 87 secured to the rock shaft 36 is connected to the clutch throwing lever 82 by a cable 88. When the pedal 37 is depressed, the shaft 36, arm 87, cable 88 and clutch throwing lever 82 are operated to shift the winding drum 77 toward the drive clutch member 79. Before the winding drum is coupled to the drive clutch member, the lifting lever 29 is released from the quadrant 31 to permit the plows to be elevated by the lifting cable 74.

The means for automatically releasing the lifting lever 29 comprises an arm 89 secured to the pedal shaft 36, a bell crank lever 90 and a throw bar 91 connecting the arm 89 to the bell crank lever 90. The latch bolt 30 carried by the lifting lever 29 is provided with an extension 30' which lies directly above the long arm of the bell crank lever 90. When the pedal 37 is depressed, and before the winding drum 77 starts to rotate, the bell crank lever 90 moves to disengage the latch bolt 30 from the quadrant 31, thereby releasing the plows and permitting them to be lifted by the cable 74.

The expanding clutch member 80 is automatically disengaged from the drive clutch member 79 to stop the winding operation after the plows have been lifted a predetermined distance. To accomplish this, the clutch throwing lever 82 is formed with an arm 93 through which the cable 74 passes, and said cable is provided with a yieldable abutment 94 adapted to engage the arm 93, with the result of rocking the clutch throwing lever 82 so as to disengage the expanding clutch member 80 from the drive member 79.

I claim:—

1. In a plow, the combination of a frame, a plow member pivotally mounted with respect to the frame, an adjustable plow holding device mounted on the frame forming a support for the plow member, including means for locking the plow holding device to prevent the plow member from being lifted, a power shaft, a plow lifting device separate from said plow holding device, a rock-shaft, means operably connected to the rock-shaft for unlocking the plow holding device, and a shifter operably connected to the rock-shaft to couple the plow lifting device to the power shaft after the plow holding device has been unlocked.

2. In a plow, the combination of a frame, a plow member pivotally mounted with respect to the frame, an adjustable plow holding device mounted on the frame forming a support for the plow member, including means for locking the plow holding device to prevent the plow member from being lifted, a power shaft, a plow lifting device separate from said plow holding device, a lever-operated rock-shaft, means operably connected to the rock-shaft for unlocking the plow holding device and embodying a pivoted crank lever, means for coupling the power shaft to the plow lifting device, and means for transmitting movement from the rock-shaft to the coupling means so as to unlock the plow holding device and thereafter couple the power shaft to the plow lifting device.

3. In a plow, the combination of a frame, a plow member pivotally mounted with respect to the frame, an adjustable plow holding device mounted on the frame forming a support for the plow member, including means for locking the plow holding device to prevent the plow member from being lifted, a power shaft, a drive clutch member secured to the power shaft, a plow lifting device including a driven clutch member adapted to engage the drive clutch member to provide for the transmission of power from the power shaft to the plow lifting device, a clutch shifter for actuating the driven clutch member, a lever-operated rock-shaft, a releasing device for unlocking the plow holding device; means for transmitting movement from the rock shaft to the releasing device to unlock the plow holding device and means for transmitting movement from the rock shaft to the clutch shifter so as to couple the clutch members after the releasing device has been actuated.

4. In a plow, the combination of a frame, a plow member pivotally mounted with respect to the frame, an adjustable plow holding device mounted on the frame forming a support for the plow member, including means for locking the plow holding device to prevent the plow member from being lifted, a power shaft, a drive clutch member secured to the power shaft, a lever-operated rock-shaft, a releasing device for unlocking the plow holding device, means for transmitting movement from the rock-shaft to the releasing device, and a plow lifting device including a driven clutch member adapted to engage said drive clutch member, a winding drum operable by the driven clutch member, a flexible member connected to the plow member and adapted to be wound onto the drum to lift the plow member and a clutch shifter for actuating the driven clutch member; and means for transmitting movement from the rock shaft to the clutch shifter to provide for the transmission of power to the winding drum and flexible member after the releasing device has been actuated.

HENRY W. KARDELL.

In the presence of—
M. M. APGAR,
A. J. McCAULEY.